United States Patent [19]

Sakaguchi et al.

[11] 4,304,314

[45] Dec. 8, 1981

[54] INDUSTRIAL VEHICLE WITH SEAT COOLING ARRANGEMENT

[75] Inventors: Masaoki Sakaguchi, Higashi-yamato; Toshio Miyazaki, Sayama, both of Japan

[73] Assignee: Nissan Motor Co., Ltd., Japan

[21] Appl. No.: 129,317

[22] Filed: Mar. 11, 1980

[30] Foreign Application Priority Data

May 10, 1979 [JP] Japan .................................. 54-56301

[51] Int. Cl.³ .............................................. B60H 1/26
[52] U.S. Cl. .................................. 180/54 A; 98/2.03; 165/41; 180/68 R
[58] Field of Search .......................... 180/54 A, 68 R; 98/2.03; 165/41; 296/63, 65 R, 66, 67

[56] References Cited

U.S. PATENT DOCUMENTS

| | | | |
|---|---|---|---|
| 2,151,865 | 3/1939 | Nallinger | 180/54 A |
| 3,112,002 | 11/1963 | Van Der Lely | 180/54 A |
| 3,812,927 | 5/1974 | Kawamura | 180/54 A |
| 4,169,574 | 10/1979 | Garvey et al. | 296/65 R X |

FOREIGN PATENT DOCUMENTS

| | | | |
|---|---|---|---|
| 364276 | 11/1920 | Fed. Rep. of Germany | 180/54 A |
| 1490914 | 6/1967 | France | 180/54 A |

Primary Examiner—Joseph F. Peters, Jr.
Assistant Examiner—D. W. Underwood
Attorney, Agent, or Firm—Lane, Aitken, Kice & Kananen

[57] ABSTRACT

A seat is mounted on an engine covering panel to form a clearance between a seat portion of the seat and the panel. The clearance is fluidly connected to a portion where an air flow produced by an engine cooling fan is present, thereby causing generation of air flow in the clearance to cool the seat portion.

4 Claims, 2 Drawing Figures

FIG. 1
(PRIOR ART)
FIG. 2
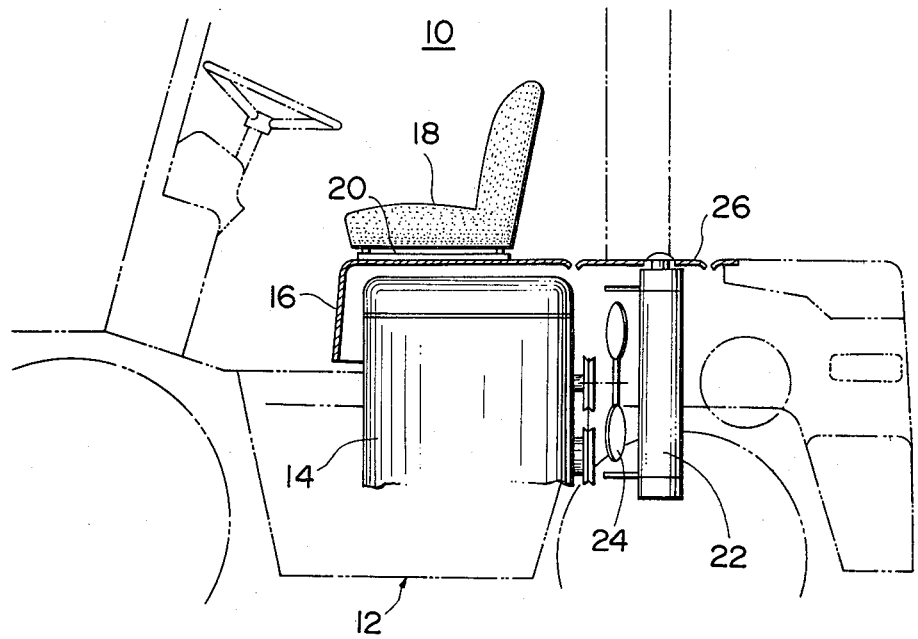
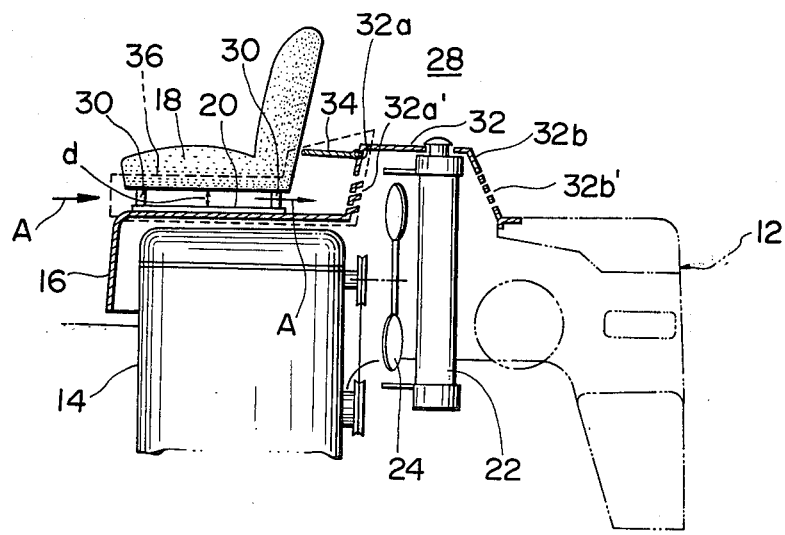

INDUSTRIAL VEHICLE WITH SEAT COOLING ARRANGEMENT

FIELD OF THE INVENTION

The present invention relates in general to industrial vehicles such as fork lift trucks, shovel loaders and toeing tractors, and more particularly to industrial vehicles of a type equipped with a seat cooling arrangement by which the seats, such as the operator's seat, can be cooled for increased riding comfort of the operator or the like in summer.

OBJECTS OF THE INVENTION

It is an object of the present invention to provide an industrial vehicle which is equipped with an improved seat cooling arrangement.

It is another object of the present invention to provide an improved seat cooling arrangement in which the cooling of the seat is made by using an air flow produced by a cooling fan of the engine.

It is still another object of the present invention to provide an improved seat cooling arrangement for industrial vehicles, which is simple in construction.

Other objects and advantages of the present invention will become apparent from the following description when taken in conjunction with the accompanying drawings.

BRIEF DESCRIPTION OF THE DRAWINGS

FIG. 1 is a sketch showing a conventional fork lift truck having no seat cooling arrangement; and FIG. 2 is a sketch showing a fork lift truck equipped with an improved seat cooling arrangement, according to the present invention.

DESCRIPTION OF PRIOR ART

Prior to describing in detail the invention, the constructions and/or arrangements of an operator's seat and its neighbourhood of a fork lift truck will be outlined with reference to FIG. 1 in order to clarify the invention.

Referring to FIG. 1; there is illustrated a conventional fork lift truck 10 having no seat cooling arrangement. As shown in the drawing, the fork lift truck 10 has at a generally middle section of a body 12 an engine 14. A top panel 16 is arranged to spacedly cover the top section of the engine 14. An operator's seat 18 is mounted on the top panel 16 via seat mounting rails 20. Mounted at the rear of the engine 14 is a radiator 22 in which engine cooling water travels to be cooled. A cooling fan 24 driven by the engine 14 is located between the engine 14 and the radiator 22 for generating an air stream directing toward the radiator 22. Designated by numeral 26 is a radiator cover.

In the conventional fork lift truck 10 described hereinabove, however, the following problem arises particularly in summer. In this season when hot days continue, if often happens that, under operation of the engine 14, the temperature of the engine room whose upper section is enclosed by the top panel 16 rises to a level from approximately 60° C. to 80° C., thereby causing the seat portion of the seat 18 to be greatly heated due to heat transmission from the engine room via the top panel 16. Thus, the operator on the seat 18 feels quite uncomfortable.

Thus, elimination of the above-mentioned drawback is an essential object of the present invention.

DESCRIPTION OF THE EMBODIMENT

Referring to FIG. 2 of the drawings, there is shown, but partly, a fork lift truck 28 having a seat cooling arrangement according to the present invention. For facilitation of explanation, description of generally the same parts as in the prior-mentioned conventional fork lift truck will be omitted, but such same parts will be designated by the same numerals in FIG. 2. The seat cooling arrangement of the fork lift truck 28 of the invention comprises a plurality of mounting brackets 30 which are interposed between the corresponding seat mounting rails 20 and the seat portion of the seat 18 so as to define a clearance (d) of for example 50 mm between the top panel 16 and the seat portion. As will become clear as the description proceeds, the clearance (d) is a passage through which air flows to cool the seat portion. It should be noted that, in the rtially from an imaginary plane which includes the upper surface of the top panel 16. The radiator cover 32 of the embodiment has a front bent portion 32a and a rear bent portion 32b each of which is formed with a plurality of openings 32a' or 32b'. The radiator cover 32 thus having generally a reversed U-shaped cross section is mounted on the top of the radiator 22 with the front bent portion 32a standing on a rear end of the top panel 16 and with the rear bent portion 32b standing on the rear section of the body 12, as shown.

Designated by numeral 34 is a damper door which is pivotally connected to an upper section of the front bent portion 32a to be pivotable from an open position wherein the damper door 34 contacts at its free end with a back side of the backrest portion of the seat 18 to a close position wherein the damper door 34 lies on the front bent portion 32a, closing the openings 32a' of that portion 32a. Although not shown in the drawing, a suitable locking means is adopted to lock the damper door 34 at the open and close positions, selectively. Now, it should be noted that when the damper door 34 assumes the open position, the clearance (d) and the interior of the radiator cover 32 become communicated.

With the above description, it will be appreciated that when the damper door 34 takes the open position under operation of the engine 14, an air flow is generated in the clearance (d) and flows in the direction indicated by arrows A due to the suction effect of the fan 22. This causes cooling of the seat portion of the seat 18, thereby providing the operator on the seat 18 with a comfortable riding in summer. While in winter, the damper door 34 is locked at the close position to prevent occurrence of air flow in the clearance (d). It should be noted that the closure of the openings 32a' by the damper door 34 prevents the radiator 22 from being over cooled by the cooling fan 24, due to increase in air flow resistance. This means shortening of warming up time of the engine 14 in winter.

As is indicated by broken lines, two wall members 36 may be attached to respective side sections of the seat 18 to enclose the clearance (d), each wall member 36 having a rear extension which leads to the front bent portion 32a of the radiator cover 32. With this construction, the air flow within the clearance (d) is more effectively made, thereby increasing the seat cooling effect of the arrangement. Further, this construction has a merit in that leg portions of the seated-person on the seat 18 are also cooled by air flowing into the clearance (d).

Although, in the foregoing description, it is stated that the seat cooling arrangement is equipped to the fork lift truck, such arrangement is also applicable to other industrial vehicles of the type having a seat on a top panel which covers the engine, such as a shovel loader and a toeing tractor.

What is claimed is:

1. A motor vehicle having an engine, a cooling fan for producing air flow which is used for cooling the engine, a top panel covering a top section of said engine, a seat having a seat portion mounted on said top panel, and a seat cooling arrangement for cooling said seat portion, said arrangement comprising:

first means for forming a first clearance (d) of a given thickness between said seat portion and said top panel; and second means for fluidly connecting said first clearance with a given portion where the air flow produced by said cooling fan is present, thereby causing generation of air flow in said clearance, said second means comprising:

a cover member having front and rear bent portions which are respectively formed with inlet and outlet openings, said cover member covering spacedly a peripheral section of said cooling fan in such an arrangement that air is admitted into the interior of said cover member via said inlet openings and is exhausted to the open air via said outlet openings when said cooling fan is in operation; and third means for defining a passage which connects said first clearance with said inlet openings of said cover member.

2. A motor vehicle as claimed in claim 1, in which said cover member is such arranged that the front bent portion faces a back face of a backrest portion of said seat, and in which said third means comprises a damper door which is pivotally connected to said front bent portion to be pivotable from a first position wherein said damper door closes a second clearance defined between said back face of the backrest portion and a front face of said front bent portion to a second position wherein said damper door lies on the front bent portion to close said inlet openings.

3. A motor vehicle as claimed in claim 2, further comprising two wall members which are attached to respective sides of said seat to enclose said first clearance, said wall members having rear extensions which lead to the front bent portion of said cover member to enclose said second clearance.

4. A motor vehicle as claimed in claim 1, in which said first means comprises:

rails each being mounted on a top face of said top panel; and a plurality of mounting brackets each being interposed between the corresponding rail and the seat portion of said seat.

* * * * *